Figure 4:
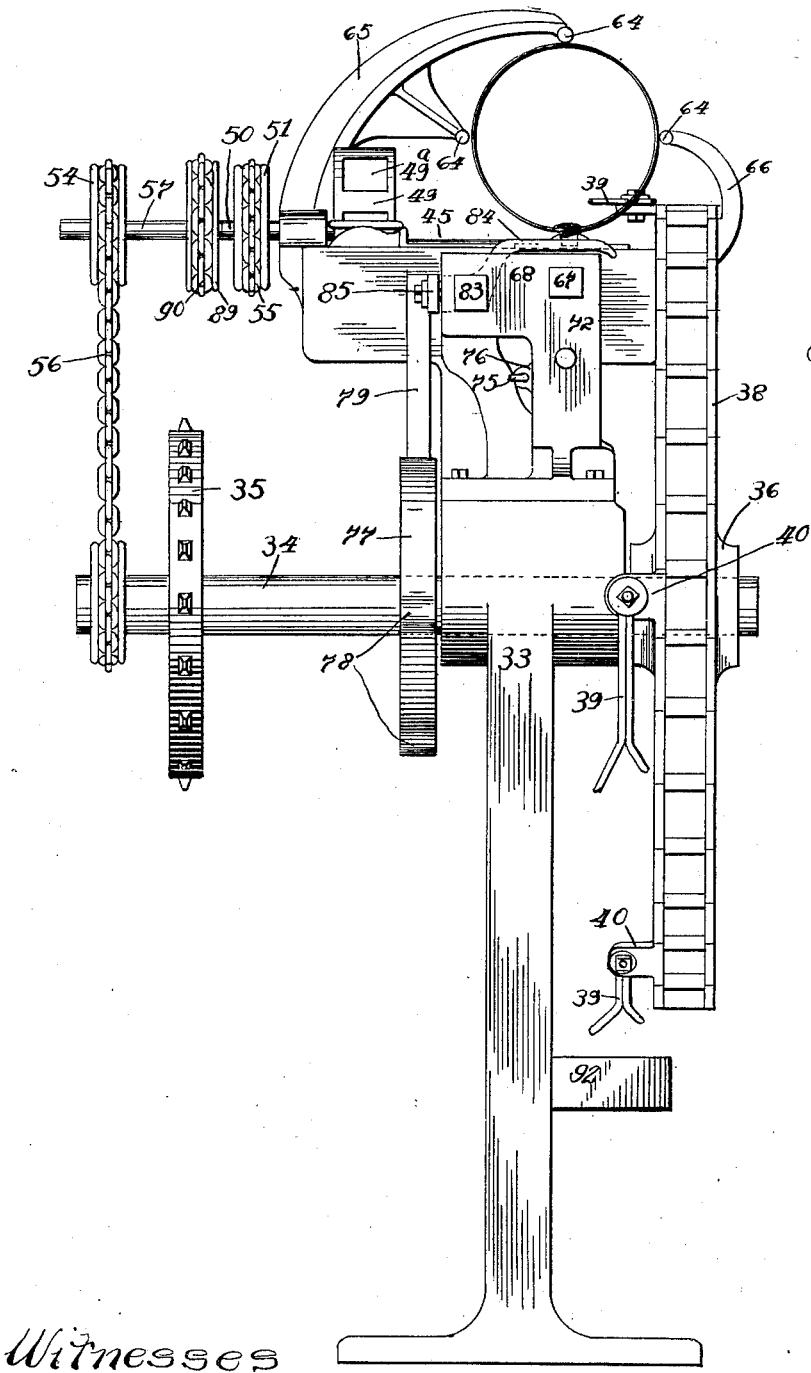

No. 732,003. PATENTED JUNE 23, 1903.
G. F. LEIGER.
CAN SOLDERING MACHINE.
APPLICATION FILED JAN. 27, 1902.
NO MODEL. 7 SHEETS—SHEET 1.
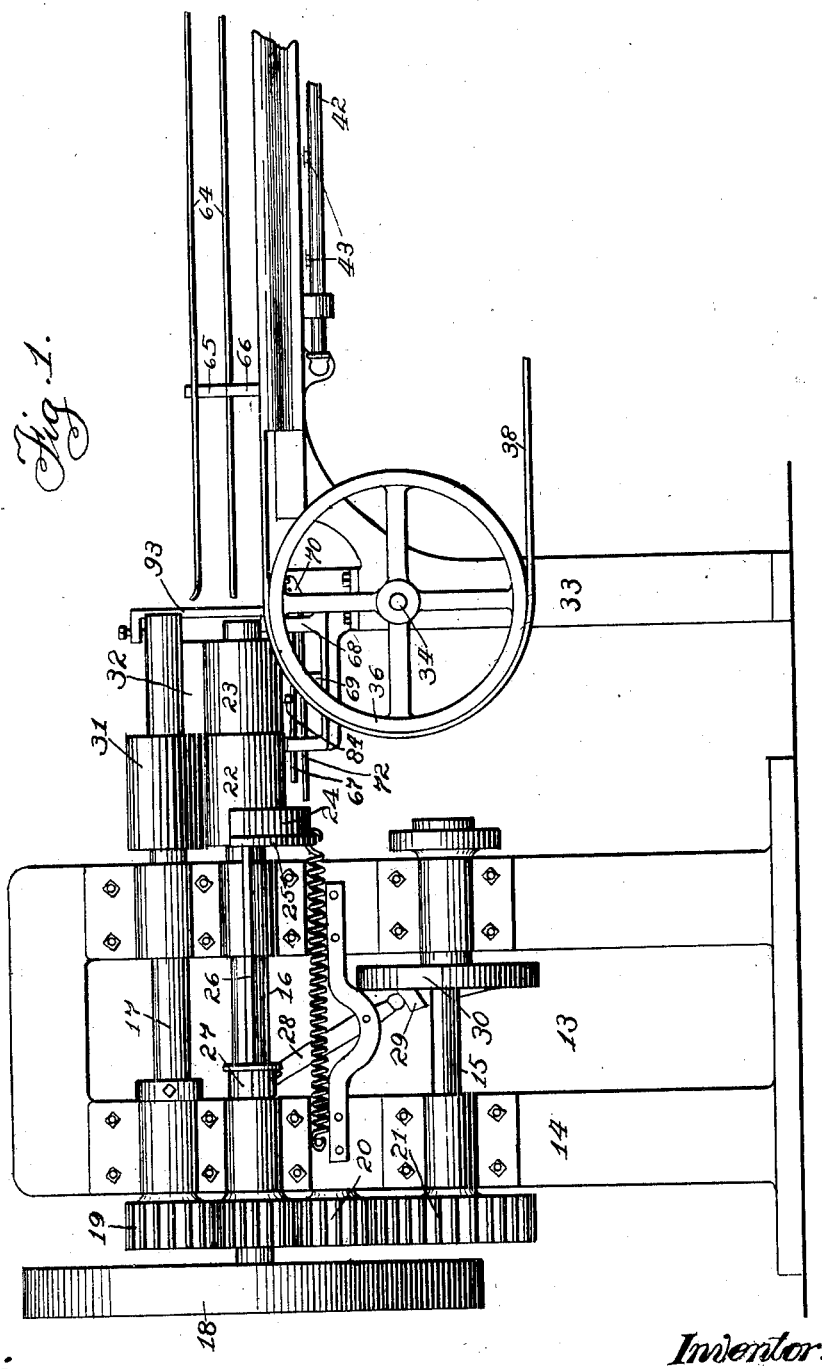

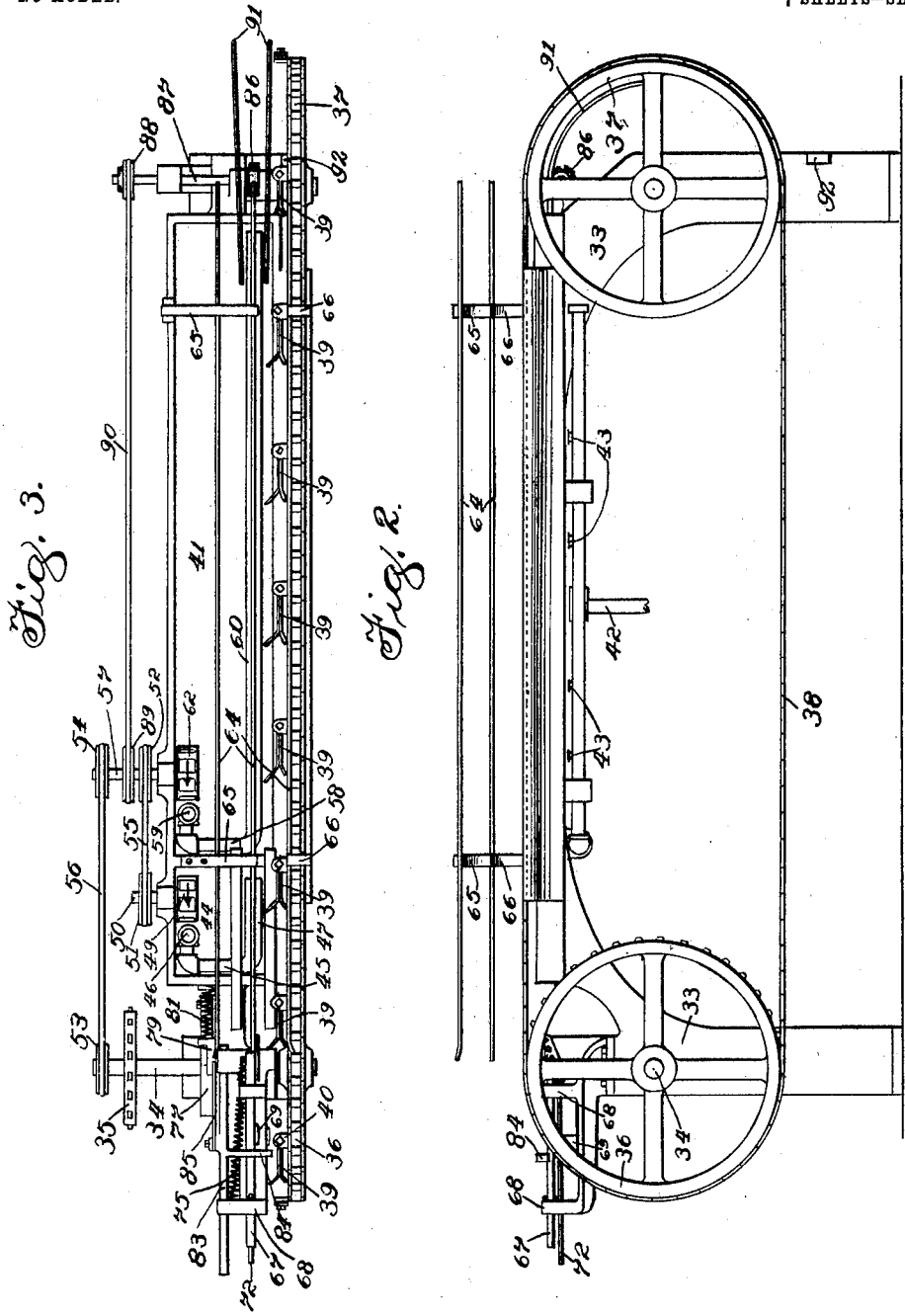

No. 732,003. PATENTED JUNE 23, 1903.
G. F. LEIGER.
CAN SOLDERING MACHINE.
APPLICATION FILED JAN. 27, 1902.
NO MODEL. 7 SHEETS—SHEET 3.

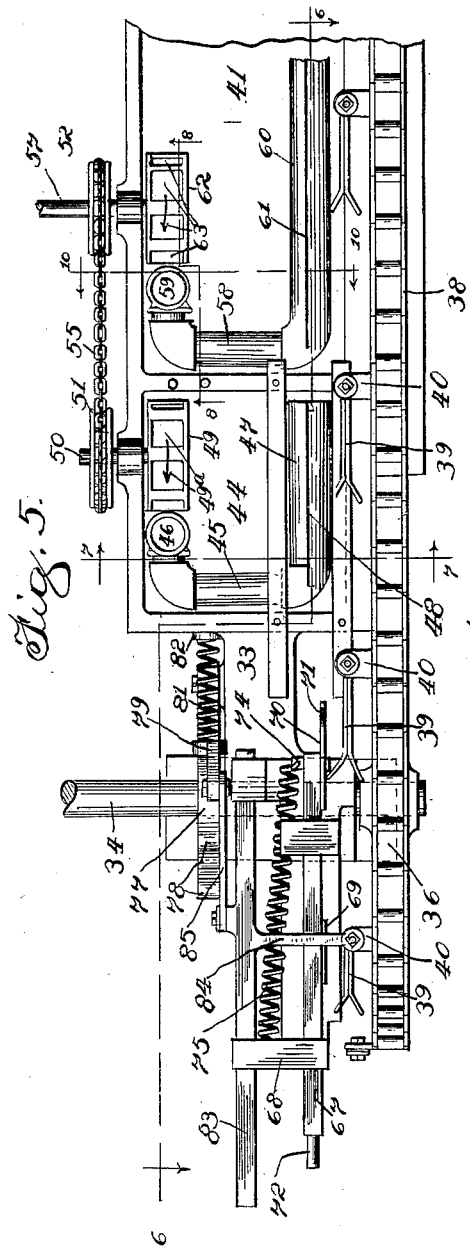

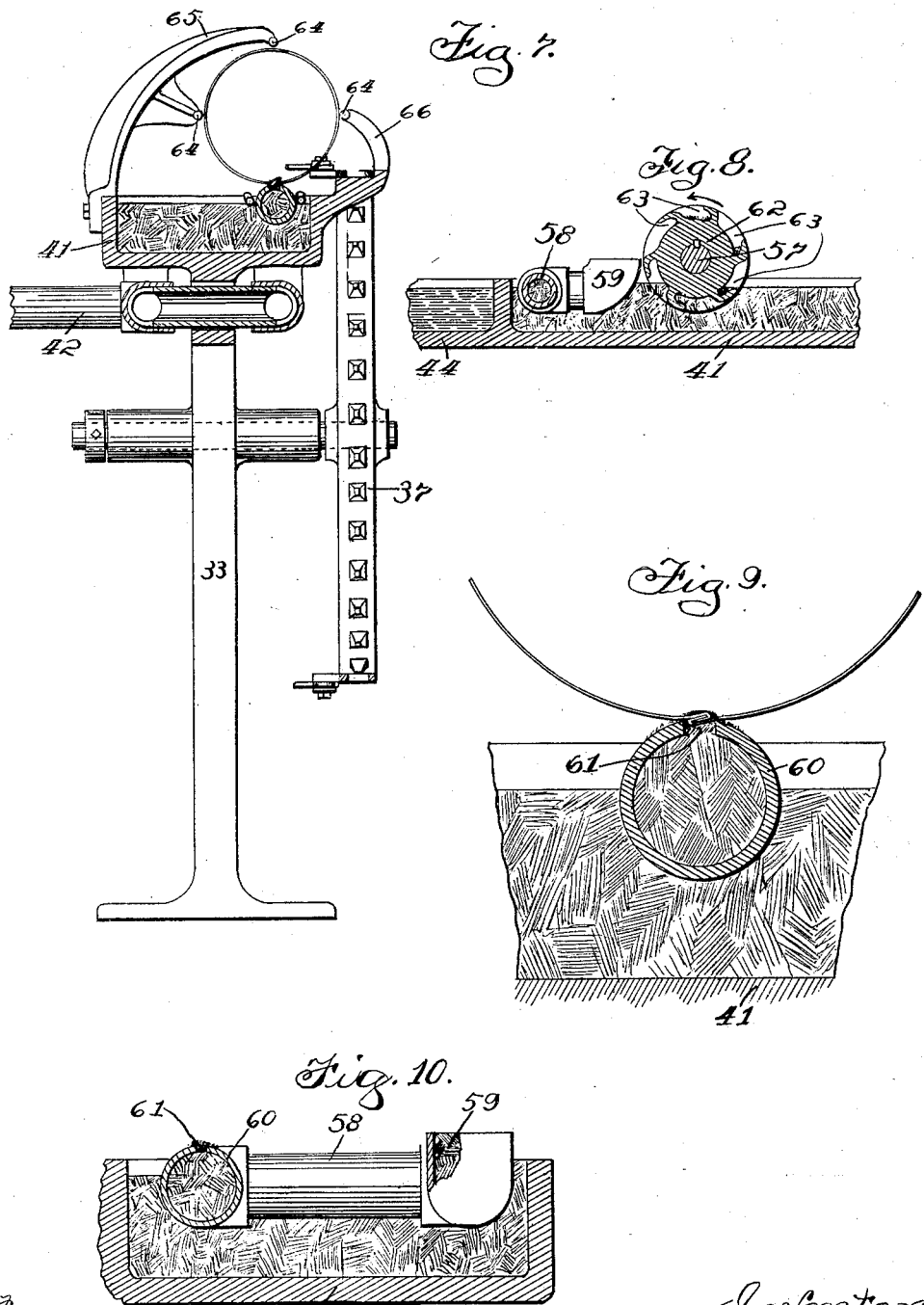

No. 732,003. PATENTED JUNE 23, 1903.
G. F. LEIGER.
CAN SOLDERING MACHINE.
APPLICATION FILED JAN. 27, 1902.
NO MODEL. 7 SHEETS—SHEET 6.
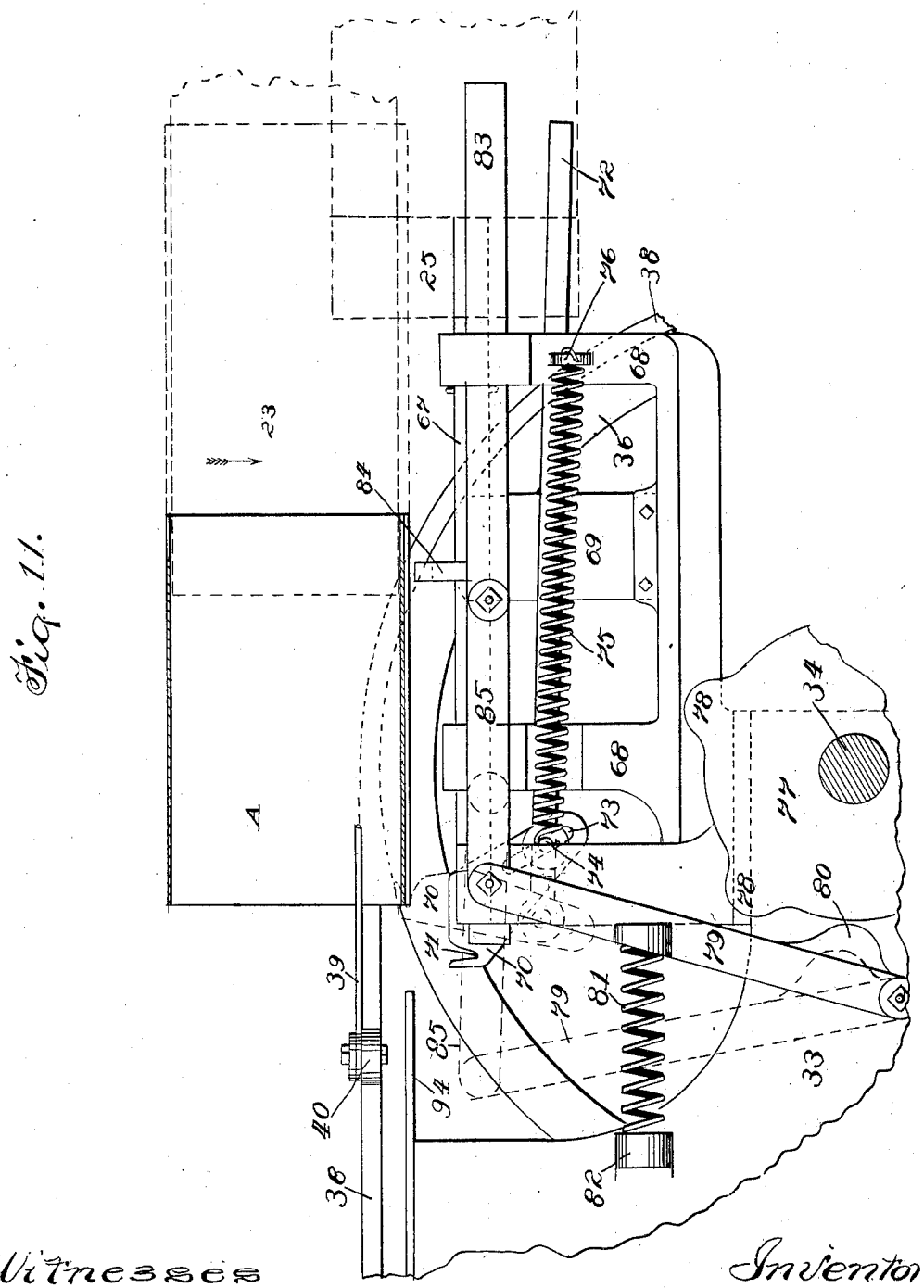

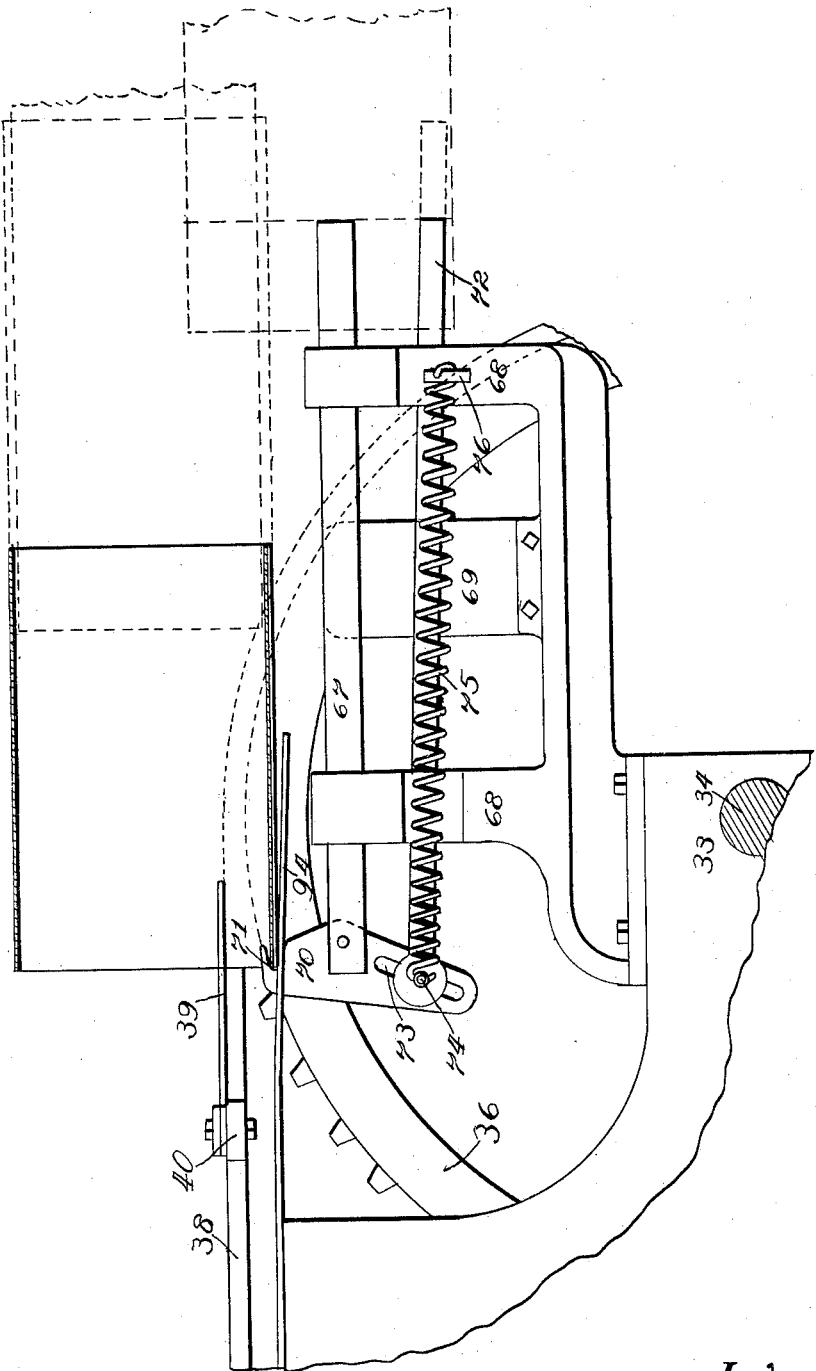

No. 732,003. Patented June 23, 1903.

UNITED STATES PATENT OFFICE.

GEORGE F. LEIGER, OF CHICAGO, ILLINOIS, ASSIGNOR OF THREE-FOURTHS TO LEWIS BENEDICT, OF CHICAGO, ILLINOIS.

CAN-SOLDERING MACHINE.

SPECIFICATION forming part of Letters Patent No. 732,003, dated June 23, 1903.

Application filed January 27, 1902. Serial No. 91,475. (No model.)

*To all whom it may concern:*

Be it known that I, GEORGE F. LEIGER, a citizen of the United States, residing at Chicago, in the county of Cook and State of Illinois, have invented certain new and useful Improvements in Can-Soldering Machines, of which the following is a specification, reference being had to the accompanying drawings.

My invention relates to can-soldering machines; and its principal object is to provide new and improved mechanism by which the side seams of cans may be soldered.

It has for a further object as an improvement in machines for soldering the side seams of can-bodies the providing of mechanism by which the cans as they are successively formed by a machine for forming the can-bodies may be automatically received from said machine by new and improved mechanism and by means of other new and improved mechanism have their side seams soldered and after being soldered delivered.

It has for a further object the improvement of mechanism for soldering the side seams of cans in sundry details hereinafter pointed out.

That which I regard as new will be set forth in the claims.

In the drawings, Figure 1 is a side elevation showing a part of my improved can-soldering mechanism connected with a machine for making can-bodies. Fig. 2 is a side elevation of my improved can-soldering machine. Fig. 3 is a top or plan view of the same machine. Fig. 4 is an enlarged detail, being an end view of the can-soldering machine viewed from the left-hand end of Figs. 2 and 3. Fig. 5 is an enlarged detail, being a top or plan view of the left-hand part of the mechanism shown in Fig. 3. Fig. 6 is an enlarged detail, being a section on line 6 6 of Fig. 5. Fig. 7 is an enlarged detail, being a vertical section on line 7 7 of Fig. 5. Fig. 8 is an enlarged detail, being a vertical section on line 8 8 of Fig. 5. Fig. 9 is an enlarged detail in cross-section, showing the passage of a can along the soldering-tube. Fig. 10 is an enlarged detail of a portion of a soldering-trough, being a section on line 10 10 of Fig. 5. Fig. 11 is an enlarged detail, partially in section, being a view of a portion of the can-forwarding mechanism at the end of the can-soldering machine nearest the can-body-forming machine; and Fig. 12 is a modification, being an enlarged detail of the same portion of the machine shown in Fig. 11 modified.

Referring to the drawings, 13 indicates a machine for forming cylindrical can-bodies. The machine shown in Fig. 1 is of the same type and operates in the same manner as the can-body-forming machine shown in Letters Patent granted to me February 11, 1902, No. 693,325. As the said machine, however, in most of its features forms no part of my present invention, it will not be necessary to describe it more fully here than is necessary to describe such parts of it as enter into and assist the operation of my present invention, reference being made to my said patent for a full description thereof. I state here at the beginning of this application that while I have shown a can-body-forming machine of the kind shown in said patent and described the same so far as its parts enter into the operation of my present invention I do not confine myself to the use of my can-soldering machine with a machine of that precise type, as any other can-body-forming machine may be used in connection with my can-soldering mechanism, or the can-soldering mechanism might be used separately and not in connection with a can-body-forming machine except in so far as hereinafter claimed.

Referring to the said can-body-forming machine, 14 indicates the framework, in which are journaled shafts 15 16 17, which are driven by a driving-wheel 18 and gears 19 20 21. 22 indicates a roller or cylinder which is mounted upon the outer end of the shaft 16. 23 indicates a roller or cylinder of slightly-smaller diameter than the roller or cylinder 22, also mounted upon the outer end of the shaft 16 beyond the roller 22 and concentric therewith. 24 indicates a semicylindrical sleeve provided with a flange 25, which slides over the surface of the roller or cylinder 22. The sleeve 24 is carried by rods 26 and a sleeve 27. The sleeve 27 is reciprocated upon the shaft 16 by means of a lever 28 and a cam 29 upon a wheel 30, carried on the shaft 15, and the sleeve 24 is thus reciprocated over the surface of the roller 22 in the manner more fully described in my said patent above referred to. 31 indicates a roll mounted upon the outer end of a shaft 17. 32 indicates a seam-presser, also carried upon the outer end of the shaft 17. These parts are fully described in my said patent above referred to and need no further description here, except to say that the can-body is formed upon the roller 22 as the same rotates in the manner described in my said patent with its side seam interlocked, that after being so formed the can-body is pushed from the roller 22 by the reciprocation of the sleeve 24, whose movements are suitably timed for that purpose, and the can-body thus formed, with its side seam formed, is pushed upon the roller 23, where the side seam is pressed by the presser 32 in the manner described in said patent. When a second can is formed upon the roller 22 in the same manner and is pushed from the roller 22 upon the roller 23, the previously-formed can, with its side seam pressed, will by the moving forward of the next can be pushed from the roller 23.

33 indicates a frame upon which my improved can-soldering mechanism is carried and supported. 34 indicates a shaft journaled in said frame and driven by means of a sprocket-wheel 35, either by being connected in any suitable manner with the driving-wheel 18 of the can-body-forming machine or by power suitably applied in any other way. 36 37 indicate sprocket-wheels which are journaled upon the end of the shaft 34 and carry a sprocket-chain 38. The sprocket-chain 38 carries upon its inner surface a number of clips 39, which, as is best shown, for instance, in Figs. 3 and 4, are mounted upon lugs 40, attached to the sprocket-chain 38 and consist of two spring-arms yieldingly held close together throughout the greater portion of their length and spreading at their free ends into a fork. 41 indicates a trough adapted to contain melted solder and supported upon the frame 33. 42 indicates gas-pipes which are connected with any suitable source of supply and are located beneath the solder-trough 41, supported by the frame 33. The pipes 42 are provided with suitable burners 43, by means of which the solder in the trough 41 may be melted and kept in a suitably fluid condition. 44 indicates a trough adapted to contain acid, which is also supported by the frame 33. 45 indicates a pipe which is placed in the trough 44. The pipe 45 has an upright portion 46, which projects somewhat above the top surface of the pipe and is provided with an arm or branch 47, which is provided with a longitudinal slot 48. 49 indicates a wheel which is mounted on a stub-shaft 50 in the side of the trough 44. The wheel 49 is provided with buckets 49$^a$ and is driven by means of pulleys 51 52 53 54 and belts or chains 55 56. The pulley 54 is mounted on the end of a stub-shaft 57, hereinafter described, journaled in the side of the trough 41. The pulley 53 is mounted upon the outer end of the shaft 34. The wheel 49 is rotated in the direction shown by the arrow and is adapted to be immersed in the acid contained in the acid-trough 44 and by its rotation will cause the buckets 49$^a$ to lift the acid out of the trough 44 into the upright portion 46 of the pipe 45, keeping the pipe full and overflowing through the slot 48, the outer end of the arm 47 being of course closed. The acid lifted into the pipe 46 by means of the wheel 49 will keep the pipe 45, as was said, constantly full, and the acid overflowing through the slot 48 will fall back again into the acid trough or bath 44. 58 indicates a pipe which is provided with an upright portion 59 and an arm 60. The upright portion 59 has its top, as is best shown in Fig. 10, somewhat above the upper surface of the pipe and is open at the top. The arm 60 is closed at its outer end and is provided with a longitudinal slot 61, which registers with the slot 48 in the pipe 47. 62 indicates a wheel provided with buckets 63, which wheel is mounted upon the inner end of the stub-shaft 57 in the solder-trough 41. The wheel is adapted to dip into the melted solder in the trough 41, and when rotated in the direction shown by the arrow in Figs. 5 and 8 the buckets 63 will dip melted solder out of the trough and deliver it into the upright portion 59 of the pipe 58. The pipe 58 will thus be kept full of solder, the melted solder overflowing through the slot 61 back into the trough 41. The slots 48 and 61 are of sufficient width to permit the passage of the seam of a can along said slots between the sides thereof, and thus to supply the proper amount of solder to the seam. By means of these devices when a can is carried in the manner hereinafter described, with its side seam in register with and passing along the slot 48 in the pipe 47 and the slot 61 in the pipe 58, the seam will be first treated with the acid in the usual manner and then soldered in the manner hereinafter described. It is to be noted that in accordance with the well-known laws of capillary attraction in liquids both the acid and the solder in overflowing through the slots 48 and 61, respectively, will round up or be convex upon their surfaces and project slightly above the upper surfaces of the pipes, as is shown somewhat exaggerated for the purpose of conveniece of illustration in Figs. 9 and 10, so that the seam of the can in passing first through the acid and then through the solder will cut through the soldering material and receive a slight portion of the acid and the solder successively upon the inside of the can-body.

64 indicates guide-rods to guide the can-body properly upon the pipes 48 and 60. The guides 64 are supported by brackets 65 66, which are supported upon the sides of the troughs 41 and 44.

67 indicates a rod which is supported in a suitable bracket 68, which is in turn supported upon the framework of the machine. The rod 67 is slidingly mounted in said bracket or support 68, so that it may move longitudinally of itself therein.

69 indicates a vertical strip of spring metal which is supported on the brackets 68 and bears upon the side of the rod 67, so as to cause it to frictionally engage the openings in the brackets 68 and afford a suitable resistance to its longitudinal movement therein.

70 indicates a latch which is pivotally carried upon the inner end of the rod 67. The manner in which said latch is pivoted upon the end of the rod 67 is best shown in the modified Fig. 12, in which certain parts shown in the other figures are not used. The latch 70 is provided with a notch 71 at one end which is adapted to engage with the end of a can and hold it in position so as to permit the longitudinal seam of said can to be delivered in register with and pass along the slots 48 and 61 in the tubes 47 and 60, above described. The lower end of the latch 70 is pivotally connected with a rod 72, which is slidingly mounted in suitable openings in the bracket 68, so as to slide freely longitudinally of itself therein. The inner end of the rod 72 is pivotally connected with the latch 70, preferably as is best shown in Fig. 12, by means of a slot 73 in said latch 70 and a set-screw 74, so that the throw of the latch, hereinafter described, may be suitably varied.

75 indicates a spring, one end of which is secured to a lug 76 in the bracket 68, and the other end is connected with the pivotal connection between the inner end of the rod 72 and the latch 70. The spring is a contraction-spring and tends to normally hold the parts in the position shown in solid lines in Fig. 11. As best shown in Figs. 11 and 12, the rod 72 is somewhat longer than the rod 67, and its inner end projects farther outward to the right.

When the can, with its formed seam, is pushed from the roller 23 by the can immediately following it, as above described, the forward edge of the flange 25 on the sleeve 24 in its forward motion contacts with the outer end of the rod 72. In the meanwhile the finished can A, which, as was said above, is being pushed from the roller 23 by the can immediately following it, is carried around by the rotation of the roller upon which the seam has been pressed, as above set forth, until the formed seam is at the lowest portion of the movement. The movements of the parts are so timed that the flange 25 of the sleeve 24 contacts the end of the rod 72 at that moment and forces it inward against the action of the spring 75, throwing the latch 70 up into the position shown in dotted lines in Fig. 11, with its notch 71 engaging the edge of the can and holding the seam in proper position to be delivered to the slots in the acid and solder pipes above described. Thereupon the end of the sleeve 24 comes in contact with the end of the rod 67, moving it also inward and carrying with it the latch 70 and the can A at the same speed. As soon as the sleeve, with its flange 25, has pushed the can from the roller 22 upon the roller 23, forcing the finished can off from the roller 23, as above described, it quickly recedes, leaving the rods 67 and 72 free to assume their original position. The rod 67, however, being frictionally held by means of the spring 69, the first operation of the spring 69 will be to throw the latch back into the position shown in solid lines in Fig. 11, freeing the can from engagement with the notch 71 and allowing the can to be carried forward by the mechanism hereinafter described. As soon as the latch 70 has, however, been thrown into the position shown in solid lines in Fig. 11 the spring 75, which is strong enough to overcome the frictional resistance caused by the bearing of the spring 69 upon the rod 67, throws the rods 67 and 72 back into their original position, carrying the latch 70 back to its original position ready to receive the next can.

77 indicates a wheel which is mounted upon the shaft 34 and which is provided upon its periphery with a number of cam projections 78.

79 indicates a lever which is pivotally mounted at its lower end upon the frame 33 and is provided with a cam projection 80 near its lower end, adapted to engage with the cam projections 78 on the wheel 77 as the same is rotated, so as to throw the lever 79.

81 indicates a spring which bears at one end upon the surface of the lever 79 and at the other end upon a lug 82 on the frame 33 and tends by its expansion to normally force the lever over toward the right in the position shown in Figs. 6 and 11.

83 indicates a rod which is slidingly mounted in suitable openings in the bracket 68, so as to slide longitudinally of itself therein. The rod 83 is provided with a finger 84, which projects above it and extends over under the path of the can, as is best shown in Fig. 4.

85 indicates a link which is pivotally connected at one end to the upper end of the lever 79 and at the other end to the rod 83, whereby when the lever is thrown by the operation of the cams 78 the rod 83 will be carried quickly inward longitudinally of itself.

When the can has been carried forward, as above described, and being engaged by the latch 70 is still further carried forward, as above described, its inner end will drop down slightly in front of the finger 84. As soon as the parts come into this position and the latch 70 is thrown so as to free it from engagement with the forward end of the can, with the side seam of the can in proper register to be delivered to the slots in the acid and solder pipes, one of the cams 78 (the movements being suitably timed for that purpose) contacts with the cam projection 80 and throws the lever 79 quickly forward into the position shown in dotted lines in Fig. 11.

This causes the finger 84 to engage in the course of its forward movement with the rear edge of the can, which, as said above, has dropped slightly in front of it, and drives the forward edge of the can into the forked end of one of the clips 39, the movement of the sprocket-chain carrying said clips being suitably timed for the purpose, and the forward edge of the can is driven between the sides of the clip, so as to be held firmly thereby. At this time the can also engages with the guides 64, and the clips are so placed that thus engaging the can as they are carried forward by the sprocket-chain 38 they will carry the can forward, with its seam in proper register, so as to pass along, first, the slot 48 of the acid-pipe 47, where it receives the acid treatment, as above set forth, then along and in register with the slot 61 of the solder-pipe 60, where the seam of the can passes through, the solder constantly overflowing through said slot, and is soldered, as above set forth. The position of the can with its seam passing along this slot and the reception of the solder upon said seam are best shown in Fig. 9.

86 indicates a rotary brush which is carried upon the end of a shaft 87 and is adapted to engage with the outer surface of the can at its seam after the can has passed along the solder-pipe, as above set forth, and to brush the superfluous solder therefrom. The shaft 87 is rotated by means of a pulley 88 upon its outer end, a pulley 89 upon the stub-shaft 57, and a belt or chain 90, connecting said pulleys 88 and 89.

91 (see Figs. 2 and 3) indicates curved guides whose curves are substantially concentric with the periphery of the wheel 37, adapted to guide the bottom of the can.

When the cans have passed beyond the brush and beyond the guides 91, they are stripped from the clips 39 by a cross-piece 92 near the bottom of the framework at its outer end or in any other suitable manner and fall from the machine, where they may be gathered into any suitable receptacle.

Referring for the moment to Fig. 1, 93 indicates a clamp which is carried upon the outer end of the shaft 17 and is adapted to engage with the outer end of the shaft 16 when the seam of the can is being pressed in order to prevent the forcing apart of the roller 23 and the seam-presser 32. All these are described in full in my previous patent above referred to and need no further description here, as they form no part of my present invention. I refer to them, however, in this application, because when the clamp 93 is used on the machine for the purpose above described it is necessary in order to prevent the cans from being struck by the revolving clamp to throw them away more rapidly than the movement of the succeeding can and the levers 67 and 72 would otherwise carry them, and to that end I have shown, described, and devised the method last above set forth by which the can is rapidly forced into the clips by means of the cams 78, lever 79, rod 83, and finger 84. In some constructions of the can-body-forming machine and in the construction, indeed, which I now prefer to make the clamp is not necessary, and I have therefore devised the modification shown in Fig. 12. In that figure the parts are all the same, except that the wheel 77, cams 78, lever 79, spring 81, rod 83, finger 84, and link 85 are omitted, and the mechanism is provided with guides 94, which project backward from the framework under the can upon each side of the latch 70 and are adapted to support the can in its forward movement. In the modification thus shown it is sufficient that the sprocket-chain 38, carrying the clips 39, be moved at a slower rate of speed than the forward motion of the sleeve 24, and the can being carried forward by the movement of the can behind it, which is of course the same as the speed of the sleeve 24, will by reason of its quicker forward movement be forced into the clips 39 and engaged thereby, they being placed upon the sprocket-chain and the movement being so timed as to insure this. This movement of the clips will of course be slower than the movement caused by the cams 78 and the lever 79; but it is sufficient, except where it is necessary to move the can rapidly, for the reason above set forth.

I have, as was said above, shown and described my can-soldering machine as used in connection with a can-body-forming machine of the kind shown in my patent aforesaid, and that is the kind which I prefer to use in connection with the can-soldering machine. It is obvious, however, that some other form of can-body-forming mechanism might be used, and, indeed, that my improved can-soldering mechanism might be used independently of a can-body-forming machine, the necessary moving parts being operated in any well-known and approved manner, and I therefore do not limit myself to the use of that form of can-body-forming machine or to the connection of my can-soldering machine therewith or with any other form of can-body-forming machine, except as hereinafter specifically claimed.

By providing pipes with longitudinal slots of suitable width to permit the passage of the seam of a can along said slots and between the sides thereof and by providing means by which the soldering material is fed continuously into said pipes, so as to continuously overflow through the slots, I secure advantages over the old form of passing the can directly through the bath, which are important, and this is particularly true with reference to the solder itself. By passing the seam of the can along this narrow slot, out of which the solder is kept constantly overflowing, a constant level of the solder is preserved for the seam of the can to contact, and by making the slot of suitable width to permit the passage of the seam along it, which width, of course, will depend upon the width of the seam to be soldered, the solder is prevented from being spread too far upon each side of the seam and waste of solder is prevented. Besides this, by constantly supplying the solder to the pipe and allowing it to continually overflow through the slot the solder in the slot is kept always clean and free from oxidation.

That which I claim as my invention, and desire to secure by Letters Patent, is—

1. In a can-soldering machine, the combination with a trough adapted to contain soldering material and a pipe located in said trough partially above the level of the soldering material therein and provided with an upwardly-projecting end having a feed-opening at its top and having an arm provided with a longitudinal slot, of mechanism adapted to continuously supply soldering material from said trough into the feed-opening of said pipe and cause the continuous overflow of said soldering material through said slot, and mechanism adapted to engage a can and carry its seam along said slot.

2. In a can-soldering machine, the combination with a trough adapted to contain solder, heating mechanism adapted to keep the solder in said trough constantly melted, and a pipe located in said trough above the level of the solder contained therein and provided with an upward-projecting portion having a feed-opening at its top and having an arm provided with a longitudinal slot, of mechanism adapted to continuously supply solder from said trough into the feed-opening of said pipe and cause a continuous overflow of said solder through said slot, and mechanism adapted to engage a can and carry its seam along said slot, substantially as described.

3. The combination with mechanism adapted to form a can-body, and mechanism adapted to eject a completed can-body from said can-body-forming mechanism, of a trough adapted to contain soldering material, devices adapted to engage the can-body and carry the side seam of the same through said soldering material, and mechanism operated by said can-ejecting mechanism and adapted to force the can into said can-engaging devices, substantially as described.

4. The combination with mechanism adapted to form a can-body, and mechanism adapted to eject the completed can-body from said can-body-forming mechanism, of a receptacle adapted to hold soldering material, a latch adapted to engage the front end of the can and hold it when so engaged in such position that its seam may be delivered to the soldering material in said receptacle, mechanism operated by said can-ejecting mechanism to engage said latch with and disengage it from the can, can-engaging mechanism adapted to engage said can when freed from said latch and to carry the seam of said can through the soldering material in said receptacle, and mechanism operated by said can-ejecting mechanism to force the cans into said can-engaging devices, substantially as described.

5. The combination with mechanism adapted to form a can-body, and mechanism adapted to eject the completed can-body from said can-body-forming mechanism, of a receptacle adapted to hold soldering material, a latch adapted to engage the front end of the can and hold it when so engaged in such position that its seam may be delivered to the soldering material in said receptacle, mechanism operated by said can-ejecting mechanism to engage said latch with and disengage it from the can, a sprocket-chain, mechanism for moving said sprocket-chain, clips on said sprocket-chain adapted to engage the can and carry its seam through the soldering material in said receptacle, and means operated by said can-ejecting mechanism to force the can into said clips, substantially as described.

6. The combination with mechanism adapted to form a can-body, and mechanism adapted to eject the completed can-body from said can-body-forming mechanism, of a receptacle adapted to hold soldering material, a latch adapted to engage the front end of the can and hold it when so engaged in such position that its seam may be delivered to the soldering material in said receptacle, mechanism operated by said can-ejecting mechanism to engage said latch with and disengage it from the can, a sprocket-chain, mechanism for moving said sprocket-chain, clips on said sprocket-chain adapted to engage the can and carry its seam through the soldering material in said receptacle, a sliding rod adapted to engage the rear end of the can and when thrown forward to force the front edge of the can into said clips, and means for reciprocating said sliding rod, substantially as described.

7. The combination with mechanism adapted to form a can-body, and mechanism adapted to eject the completed can-body from said can-body-forming mechanism, of a receptacle adapted to hold soldering material, a latch adapted to engage the front end of a can and hold it when so engaged in such position that its seam may be delivered to the soldering material in said receptacle, mechanism operated by said can-ejecting mechanism to engage said latch with and disengage it from the can, a sprocket-chain, mechanism for moving said sprocket-chain at a slower rate of speed than the movement of said can-ejecting mechanism, clips carried by said sprocket-chain and adapted to engage the front end of a can, and guides adapted to guide the disengaged cans successively into alinement with said clips, whereby when the cans are ejected by said comparatively rapidly moving can-ejecting mechanism the front edges thereof will be successively forced into said comparatively slowly moving clips, substantially as described.

8. In a can-soldering machine, the combination with a receptacle adapted to hold soldering material, a pipe located above the level of the soldering material in said receptacle and provided with a feed-opening at one end and with a longitudinal slot, and mechanism adapted to supply soldering material from said receptacle to the feed-opening of said pipe and cause a constant overflow thereof through said slot, of a latch adapted to engage the front end of a can and deliver the can with its side seam in alinement with said slot, mechanism for operating said latch and causing it to engage with and disengage from the front edge of the can, clips adapted to engage the front end of the can and carry the can with its seam in alinement with said slot and cause the seam to pass through the soldering material overflowing from said slot, mechanism for moving said clips to carry the can through said soldering material, and mechanism adapted to force the front edges of the cans successively into said clips, substantially as described.

GEORGE F. LEIGER.

Witnesses:
JULIA M. BRISTOL,
ALVY L. ROMME.